United States Patent [19]
Nosker et al.

[11] Patent Number: 5,951,940
[45] Date of Patent: *Sep. 14, 1999

[54] METHOD OF RECYCLING POST-CONSUMER PLASTIC WASTE

[75] Inventors: Thomas J. Nosker, Stockton; Richard W. Renfree, Westfield; Raymond G. Saba, Cranbury; Jose R. Fernandes, North Brunswick, all of N.J.; Kenneth E. Van Ness, Lexington, Va.

[73] Assignee: Rutgers, The State University, Piscataway, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/619,102

[22] Filed: Mar. 20, 1996

Related U.S. Application Data

[63] Continuation of application No. 08/236,447, May 2, 1994, abandoned.

[51] Int. Cl.$^6$ .................................... B29C 49/00
[52] U.S. Cl. .................... 264/523; 264/537; 264/540; 264/349; 264/917; 209/2; 209/3; 209/10; 209/173
[58] Field of Search ............... 264/37, 515, 523, 264/537, 540, 349, DIG. 69, 917; 209/2, 3, 10, 173

[56] References Cited

U.S. PATENT DOCUMENTS

| | | | |
|---|---|---|---|
| 4,122,138 | 10/1978 | Cleereman et al. | 264/535 |
| 4,797,237 | 1/1989 | Hammer et al. | 264/37 |
| 4,830,188 | 5/1989 | Hannigan et al. . | |
| 5,130,076 | 7/1992 | Blatz et al. | 264/540 |
| 5,143,308 | 9/1992 | Hally et al. | 241/76 |
| 5,225,137 | 7/1993 | Sadr | 264/37 |
| 5,255,859 | 10/1993 | Peacock et al. | 241/79.1 |
| 5,295,339 | 3/1994 | Manner | 52/518 |
| 5,298,214 | 3/1994 | Morrow et al. | 264/211.12 |

FOREIGN PATENT DOCUMENTS

| | | | |
|---|---|---|---|
| 4143374 | 6/1993 | Germany | 264/37 |
| 51-095478 | 2/1975 | Japan | 264/515 |
| 57-036617 | 2/1982 | Japan | 264/37 |
| 4-314519 | 11/1992 | Japan | 264/37 |
| 8002149 | 11/1981 | Netherlands | 264/37 |

OTHER PUBLICATIONS

Gibbs, "Various Factors Determine Recyclate Performance in Blow Molded Containers", Modern Plastics International, pp. 60–61, Jun. 1993.

Gibbs, "Post–Consumer Recycled HDPE: Suitable for Blowmolding?", Plastics Engineering, pp. 57–59, Jul. 1990.

H1120, U.S. Statutory Invention Registration, Dec. 1, 1992 Casey et al.

Schematic of Leistritz Universal Set of Screw Segments for counter–rotation System LSM 30.34 GG.

P.V. Engelmann and J.A. McInerney, M.D. Monfore, Extrusion–Compression of Commingled Thermoplastics: Screening of the Processing Conditions, ANTEC '92, pp. 1189–1191.

K.D. Webber, S.A. Swint, T. Conklin, and C.I. Chung, Processing of Post–Consumer Commingled Plastics Waste for Consistent and Good Properties, ANTEC '91, pp. 2175–2178.

T. Rattray, P&G and Blow Molded Bottle Recycling, ANTEC '93, pp. 3065–3069.

Sandra A. Swint, Kevin D. Webber and Chan I. Chung, Plastic Waste Management Reycling and Alternatives, Oct. 17–18, 1990.

M. Xanthos, A. Patel, S. Dey, S.S. Dagli and C. Jacob, Compatibilization of Refined Commingled Post–Consumer Plastics, ANTEC '92.

*Primary Examiner*—Catherine Timm
*Attorney, Agent, or Firm*—Lerner, David, Littenberg, Krumholz & Mentlik, LLP

[57] ABSTRACT

A method of recycling mixed post-consumer plastics waste includes the steps of providing mixed post-consumer plastics waste including polyolef in and non-polyolefin components, and melt-compounding the waste so as to form a continuous phase including a blend of the polyolefin components with the non-polyolefin components microdispersed therein. Preferably, the waste also includes one or more intrinsic compatibilizers, and the method includes the intrinsic compatibilizers at least partially compatibilizing the microdispersed components in the continuous phase.

32 Claims, No Drawings

METHOD OF RECYCLING POST-CONSUMER PLASTIC WASTE

This is a continuation of application Ser. No. 08/236,447, filed May 2, 1994, now abandoned.

BACKGROUND OF THE INVENTION

As the efforts to recycle post-consumer plastic waste have increased in recent years, so have the demands to make the recycling process as economically feasible as possible. At present, the majority of municipal, mixed post-consumer plastic waste includes polyethylene terephthalate (PET) materials, such as soda bottles, and unpigmented high-density polyethylene (HDPE) materials, such as milk bottles, as well as other materials and types of plastic. Most of the soda and milk bottles are typically removed from the waste stream and reprocessed separately by extrusion to yield separate streams of recycled extruded HDPE and PET.

The remainder of the plastic waste stream includes containers of mixed resin types and pigments, and usually includes a predominance of polyolefins such as polyethylene (PE) and polypropylene (PP), as well as polystyrene (PS), polyvinyl chloride (PVC) and non-soda bottle PET. The remainder of the waste stream may also include other resins, in addition to some PET and HDPE materials which were not selected in the sortation process. The conglomeration of these materials is known as "curbside tailings".

Traditionally, it has been considered economically unfeasible to recycle curbside tailings due to the low-grade nature of the resulting extruded materials. Further, although sorting the curbside tailings plastics might result in a more useful end product, high labor and/or equipment costs make sorting uneconomical. While most efforts in the area of plastics recycling have been focused on the goal of achieving error-free separation of plastics by resin type, a system which efficiently recycles the curbside tailings resulting from an imperfect sortation process into a valuable material is required.

One paper, K. D. Webber, S. A. Swint, T. Conklin and C. I. Chung, *Processing of Post-Consumer Commingled Plastics Waste for Consistent and Good Properties*, ANTEC '91 at p. 2175–2178 suggests that the addition of certain compatibilizers in a mix which simulates commingled plastics may result in an end product which has a greater impact strength. The paper notes that further research is required to find the "optimum compatibilizer".

The present invention provides methods to meet these needs.

SUMMARY OF THE INVENTION

The present invention provides a method of recycling mixed post-consumer plastics waste by producing a blow-moldable material. The method includes the steps of providing mixed post-consumer plastics waste including polyolefin and non-polyolefin components, and melt-compounding the waste so as to form a continuous phase including a blend of the polyolefin components with the non-polyolefin components microdispersed therein.

Another preferred embodiment of the present invention provides a method of recycling mixed post-consumer plastics waste including the steps of providing mixed post-consumer plastics waste including polyolefin components, non-polyolefin components and one or more intrinsic compatibilizers, and melt-compounding the waste so as to form a continuous phase including a blend of the polyolefin components with the non-polyolefin components microdispersed therein, the intrinsic compatibilizers at least partially compatibilizing the microdispersed components in the continuous phase. The method may also include adding extrinsic compatibilizers to the waste before the melt-compounding step.

Preferably, the melt-compounding step includes processing the waste in a multi-screw extruder, such as a non-intermeshing or partially intermeshing counter-rotating multi-screw extruder.

The method also preferably includes the step of separating the waste according to density and/or hydrodynamics in order to remove some of the non-polyolefin components.

If the waste includes non-polymeric contaminants, the method may also comprise the step of cleaning the waste prior to the melt-compounding step so as to remove at least some of the non-polymeric contaminants but leave at least some of the intrinsic compatibilizers. Preferably, if the waste includes multi-layer laminates, the intrinsic compatibilizers include tie layers in the laminates. If the waste includes container parts with labeling adhesives thereon, the intrinsic compatibilizers also include the labeling adhesives. The cleaning step may include washing the waste in an aqueous wash liquid and separating contaminants from the waste using an aqueous medium.

Desirably, the step of providing mixed post-consumer waste includes removing at least some polyolefin and polyethylene terephthalate containers from an incoming plastics waste stream so as to leave a tailings stream as the post-consumer plastics waste.

Preferably, the method includes the step of filtering the blend during the melt-compounding step so as to control the presence and size distribution of the non-thermoplastic contaminants in the blend.

The melt-compounding step may also include subjecting the waste to a melting temperature between about 190 to 255 degrees Celsius, and subjecting the waste to controlled dispersive and distributive mixing resulting in minimum shear degradation and heat history.

Desirably, the method additionally includes the step of pelletizing the melt-compounded blend, and/or blow-molding objects or products from the blend.

Yet another preferred embodiment of the present invention is a melt-compounded polymeric blend made by a process including the steps of providing mixed post-consumer plastics waste including polyolefin components, non-polyolefin components and one or more intrinsic compatibilizers, and melt-compounding the waste so as to form a continuous phase including a blend of the polyolefin components with the non-polyolefin components microdispersed therein, the intrinsic compatibilizers at least partially compatibilizing the microdispersed components in the continuous phase.

DETAILED DESCRIPTION OF THE PREFERRED EMBODIMENTS

The process of the preferred embodiment of the present invention generally starts with the provision of mixed municipal post-consumer plastic wastes including polyolefin and non-polyolefin components. The waste may come from a source such as a materials recovery facility and include polyethylene terephthalate (PET) materials such as soda bottles and other custom PET containers, high-density polyethylene (HDPE) materials such as milk bottles and pigmented HDPE containers, and other containers and waste products composed of polystyrene (PS), polypropylene (PP), polyethylene (PE) and polyvinyl chloride (PVC), and may include non-polymeric materials and contaminants. For example, the waste stream from a typical materials recovery facility contains, by weight, about 48% HDPE not from milk bottles, 26% PET from soda bottles, 21% unpigmented HDPE from milk bottles, 2% PET not from soda bottles, 2% PVC, and smaller amounts of PS, PP, PE and other materials. The actual percentages may differ quite substantially from facility to facility.

First, the waste is sorted by removing the most saleable plastic materials. Nearly all of the soda and milk bottles are removed, thus resulting in the removal of the majority of PET and unpigmented HDPE materials from the waste stream. The manner of removal can be any manner presently known in the art, including manual or mechanical. The remaining waste is hereinafter referred to as "curbside tailings". After sortation, the curbside tailings are shredded to a particle size of about 6–10 mm.

The curbside tailings are then processed through a washing and separation stage to remove an additional amount of non-polyolefins. Such non-polyolefin removal may be accomplished by use of a sink-float system, hydrocyclones, water elutriation or any system which sorts waste materials based on density and/or hydrodynamics. For example, if a water elutriation system is used in the separation stage, the waste is placed in an aqueous solution to clean and remove some of the non-polymeric contaminants. The water elutriation system also allows density separation since most heavy contaminants, such as glass, metals and fibers, may be separated from the lighter components.

The "cut off" point of the separation may be adjusted. Typically, it is set to leave predominantly polyolefins in the tailings and remove most of the non-polyolefin polymers, i.e., in sink/float systems the cut off point is about 1.0. Nonetheless, substantial amounts of the non-polyolefin polymers remain in the tailings, i.e., in the light or polyolefin bearing fraction. The cutoff point of the separator can be adjusted to retain more non-polyolefin materials and increase the volume of the minor fraction. As described below, the washing and separation stages should leave at least some of the intrinsic compatibilizers.

At this stage, the remaining curbside tailings will include a wide variety of different materials and resins. For example, the typical remaining tailings will include polyolefins such as polypropylene (PP) and polyethylene (PE). Some non-polyolefin components will also be present, such as polystyrene (PS) and polyvinyl chloride (PVC), as well as some PET which was not selected in the sortation and separation processes.

In addition, the waste will also include a number of compatibilizers which are intrinsically present in the waste stream due to the nature of post-consumer commingled plastic waste. For example, the adhesives used to fix labels to bottles often contain ethylene vinyl acetate (EVA). Another source of intrinsic compatibilizers are multi-layer laminates such as multi-layer bottles, where the tie layers contain compatibilizers. Among the compatibilizers found in multi-layer bottles are EVA and EVOH (ethylene vinyl alcohol). Thus, as long as the sortation and separation steps do not completely remove all of the compatibilizers which are present within the curbside tailings, then some compatibilizers will enter the next step of compounding and microdispersion.

Next, the curbside tailings are melt compounded and microdispersed so as to form a continuous phase including a blend of the polyolefin components with a minor phase including the non-polyolefin components microdispersed therein. The compatibilizers will also be melt compounded with the polyolefins and the non-polyolefins so as to partially compatibilize the microdispersed components in the continuous phase. The compatibilizers tend to promote bonding of the minor phases to the major phase. Optimum microdispersion results in a dimension of the domain (assuming spherical domains) of no greater than 5 microns.

Preferably, the mix is melt-compounded by use of a multi-screw extruder. It is also desirable for the extruder to be counterrotating and non-intermeshing or partially intermeshing in order that during compounding and microdispersion the desired control of the dispersive and distributive mixing is maintained such that minimum shear degradation and heat history is incurred, while also providing adequate compounding. The desired extrusion system also allows non-melted solids to pass through the extruder with minimal damage to the screw or the compounding process.

In the preferred embodiment, the initial stages of compounding are directed to dispersion, i.e., reduction in the size of the minor-phase (non-polyolefin) domains, and the latter stages of compounding are directed to provide more uniform distribution.

One acceptable screw extruder is sold by Leistritz, Model No. LSM 30.34. Using this extruder, the model numbers of the screw elements from feed end to die end are ZE (initials ZE correspond with a final disk), ZD-26-R8 (initials ZD correspond with a distance element), ZD-26-R8, FF 1-20-R (initials FF correspond with a conveying element, free meshing), KFD 1-20/20-R (initials KFD correspond with a compression element, intermeshing), FD 1-20-R (initials FD correspond with a conveying element, close meshing), ZD-26-R16, ZS-33.4-R8 (initials ZS correspond with a shearing element), ZD-26-R16, FD 1-15-R, FD 1-20-R4, ZD-26-R16, ZS-33.4-R8, ZD-26-R16, FD 1-12-R, ZD-26-R16, ZS-33.4-R8, ZD-26-R16, FD 3-30-R, FD 26-R16, FF 1-20-R4, FD 3-30-R2. The operating temperatures of the extruder, by zone from feed end to die end, are preferably set to 220, 210, 200, 220, 250, 255, 235, 190, 23, 23, 23, 23 (degrees Celsius), and the screw rotation is set to 280 RPM.

The compatibilized material is next melt-filtered. Thus, substantially all non-thermoplastic contaminants in the blend are removed, preferably by means of passing the mix through a screen filter which removes all material greater than the screen pack dimensions. For example, a 20 mesh filter can be used to remove all particles with dimensions greater than 0.0331 inches.

After melt-filtering, the resulting polymer blend is cooled and formed into pellets using conventional pelletizing equipment. The blend may also be molded directly into a desired container or product.

The pellets may be used in the manufacture of other containers or plastic objects. The polymer alloys and blends which result from this process are complex materials, in terms of polymer composition and/or residual contamination. Because the properties of the curbside tailings material compare favorably with virgin resins, the material may be substituted for the virgin resins or added as recycled content to virgin resins. Further, these materials also have the capability to be processed by the same conventional processing equipment utilized for virgin resins.

By microdispersing the non-polyolefin components within the polyolefin components, the pellets may be used in the demanding process of injection or extrusion blow molding. Traditionally, extruded curbside tailings have been considered insufficient for the demanding process of blow molding because of the "impure" nature of the blend. Absent microdispersion of the non-polyolefin components within the polyolefin components, attempts to blow mold generally result in containers having variable and unreliable wall thickness. In other words, the minimum gauge available for films, sheets, or container walls will be affected by the degree of microdispersion of the phases and/or contaminants.

Another advantage of the present invention is its tremendous tolerance for errors in the sorting and separation processes. It is not necessary for the plastics to be completely sorted by resin type. The presence of PET, PVC, and PS in the curbside tailings will not adversely affect the overall qualities of the end product. In addition, the adhesives used on bottle labels and tie layers in multilayer structures actually increase the quality of the end product due to the compatibilization of the discrete phases. The ability to derive useful products from these mixed polymers significantly reduces the cost of the entire process by eliminating the costs of attempting to sort curbside tailings with near perfect accuracy and by eliminating the need to add costly compatibilizers.

It is also possible to use the blended curbside tailings materials as a component of a multi-layer structure. Use of the multi-layered blow molded structure is preferred when the color of the curbside tailings material (often green or gray) is considered undesirable for marketing reasons, or when food regulations prevent the direct contact of recycled plastics with food products. By way of example, a virgin or recycled material, of the appropriate color, can be coextruded as the outer layer in order to provide the desired color appeal for the product. The recycled resin would then be incorporated as a middle or outer layer with a food grade resin used as the food contact layer.

Thus, this process allows the production of a generic or mixed polymer resin (which can include PVC) from mixtures of unseparated or partially separated contaminated plastic wastes. Also, through this process, the resultant material can tolerate relatively high degrees of contamination in terms of other polymer components or non-polymeric components.

In certain cases, it may be advantageous to add extrinsic compatibilizers into the mix of curbside tailings in order to enhance the characteristics of the end product. That is, compatibilizing substances as mentioned above or silane compounds can be provided prior to the microdispersion stage and in addition to those intrinsically present in the tailings. The extrinsic compatibilizers supplement the intrinsic compatibilizers.

It is also contemplated that the sorting and separation steps may be removed all together, such that all polymers present in post-consumer waste are microdispersed and compounded together in accordance with the present invention. The desired characteristics of the end product will determine the standards of sortation.

Although the invention herein has been described with reference to particular embodiments, it is to be understood that the embodiments are merely illustrative of the principles and application of the present invention. It is therefore to be understood that numerous modifications may be made to the embodiments and that other arrangements may be devised without departing from the spirit and scope of the present invention as defined by the claims.

What is claimed is:

1. A method of recycling mixed post-consumer plastics waste by producing a blow moldable material comprising the steps of (a) providing mixed post-consumer plastics waste including polyolefin and non-polyolefin components, and
   (b) melt-compounding said mixed post-consumer plastics so as to form a continuous phase including a blend of said polyolefin components and minor phases including said non-polyolefin components, said minor phases being microdispersed in said continuous phase, and said microdispersed minor phases having domains of about 5 microns or less, wherein said resulting material may be blow molded.

2. A method of recycling mixed post-consumer plastics waste comprising the steps of:

(a) providing mixed post-consumer plastic waste including polyolefin and non-polyolefin components, said waste further including one or more intrinsic compatibilizers, and
   (b) melt-compounding said mixed post-consumer plastics so as to form a continuous phase including a blend of said polyolefin components and minor phases including said non-polyolefin components, said minor phases being microdispersed in said continuous phase and said intrinsic compatibilizers at least partially compatibilizing said minor phase in said continuous phase, and said microdispersed minor phases having domains of about 5 microns or less, wherein said resulting material may be blow molded.

3. A method as claimed in claim 2 wherein said step of melt-compounding includes the step of processing the waste in a multi-screw extruder.

4. A method as claimed in claim 3 wherein said processing step is performed in a non-intermeshing, counter-rotating multi-screw extruder.

5. A method as claimed in claim 3 wherein said processing step is performed in a partially intermeshing, counter-rotating multi-screw extruder.

6. A method as claimed in claim 2 further comprising the step of separating the waste according to density in order to remove some of said non-polyolefin components.

7. A method as claimed in claim 2 wherein said waste includes non-polymeric contaminants, the method further comprising the step of cleaning the waste prior to said melt-compounding step so as to remove at least some of said non-polymeric contaminants but leave at least some of said intrinsic compatibilizers.

8. A method as claimed in claim 7 wherein said cleaning step includes the steps of washing the waste in an aqueous wash liquid and separating contaminants from the waste using an aqueous medium.

9. A method as claimed in claim 2 wherein said step of providing mixed post-consumer waste includes the step of removing at least some polyolefin and polyethylene terephthalate containers from an incoming plastics waste stream so as to leave a tailings stream as said post-consumer plastics waste.

10. A method as claimed in claim 2 wherein said waste includes multi-layer laminates and said intrinsic compatibilizers include tie layers in said laminates.

11. A method as claimed in claim 2 wherein said waste includes container parts with labeling adhesives thereon and said intrinsic compatibilizers include said labeling adhesives.

12. A method as claimed in claim 2 further comprising the step of filtering the blend during said melt-compounding step so as to control the presence and size distribution of the non-thermoplastic contaminants in the blend.

13. A method as claimed in claim 2 wherein said melt-compounding step includes the step of subjecting the waste to a melting temperature between about 190 to 255 degrees Celsius.

14. A method as claimed in claim 2 wherein said melt-compounding step includes the step of subjecting the waste to controlled dispersive and distributive mixing resulting in minimum shear degradation and heat history.

15. A method as claimed in claim 2 further comprising the step of pelletizing the melt-compounded blend.

16. A method as claimed in claim 2 further comprising the step of blow-molding objects or products from said blend.

17. A method as claimed in claim 2 further comprising the step of adding extrinsic compatibilizers to said waste before said melt-compounding step.

18. A method as claimed in claim 2 further comprising the step of separating the waste according to the hydrodynamics of the waste in order to remove some of said non-polyolefin components.

19. A method of recycling mixed post-consumer plastics waste to produce a blow moldable material comprising the steps of:
 (a) providing mixed post-consumer plastics waste including polyolefin and non-polyolefin components;
 (b) separating at least a portion of said non-polyolefin components from said mixed post-consumer plastics; and
 (c) melt-compounding said mixed post-consumer plastics so as to form a continuous phase including a blend of said polyolefin components and minor phases including said non-polyolefin components, said minor phases being microdispersed in said continuous phase, and said microdispersed minor phases having domains of about 5 microns or less, wherein said resulting material may be blow molded.

20. The method of recycling mixed post-consumer plastics waste of claim 19, wherein said step of separating at least a portion of said non-polyolefin components from said mixed post-consumer plastics waste is accomplished by a density separation.

21. The method of recycling mixed post-consumer plastics waste of claim 20, wherein, said density separation is accomplished using a separation medium which separates components having a density of greater than about 1.0 less than about 1.0.

22. The method of recycling mixed post-consumer plastics waste of claim 21, wherein, said separation medium is water.

23. The method of recycling mixed post-consumer plastics waste of claim 20, wherein said step of melt-compounding includes the step of processing the mixed post-consumer plastics in a multi-screw extruder.

24. The method of recycling mixed post-consumer plastics waste of claim 20, further comprising the step of blow-molding objects from said melt-compounded mixed post-consumer plastics.

25. The method of claim 1 wherein said resulting blow moldable material may be processed in the same equipment used to process virgin resins.

26. The method of claim 1 wherein said blow moldable material is produced without the addition of extrinsic compatibiltzers.

27. The method of claim 25 wherein said blow moldable material is produced without the addition of extrinsic compatibilizers.

28. The method of claim 2 wherein said resulting blow moldable miaterial may be processed in the same equipment used to process virgin resins.

29. The method of claim 2 wherein said blow moldable material is produced without the addition of extrinsic compatibilizers.

30. The method of claim 19 wherein said resulting blow moldable material may be processed in the same equipment used to process virgin resins.

31. The method of claim 19 wherein said blow moldable material is produced without the addition of extrinsic compatibilizers.

32. A method of using recycled plastic to make a blow molded container comprising the steps of:
 (a) providing a blow moldable melt compounded mixed post-consumer plastics waste which includes a continuous phase of polyolefin components and minor phases of non-polyolefin components, said minor phases being microdispersed in said continuous phase, and said microdispersed minor phases having domains of about 5 microns or less; and
 (b) blow molding said blow moldable melt compounded mixed post-consumer plastics waste so as to form a container.

* * * * *

UNITED STATES PATENT AND TRADEMARK OFFICE
CERTIFICATE OF CORRECTION

PATENT NO. : 5,951,940
DATED : September 14, 1999
INVENTOR(S) : Nosker et al.

It is certified that error appears in the above-identified patent and that said Letters Patent is hereby corrected as shown below:

On the title page, item [57]
In the ABSTRACT, line 3, "polyolef in" should read --polyolefin--.

Column 1, line 65, "non-polyolef in" should read --non-polyolefin--.

Column 7, line 41, after "1.0" insert --from components having a density--.

Signed and Sealed this

Eleventh Day of April, 2000

Attest:

Attesting Officer

Q. TODD DICKINSON

Director of Patents and Trademarks